United States Patent
Wong (10) Patent No.: US 9,747,328 B2
(45) Date of Patent: *Aug. 29, 2017

(54) METHOD AND APPARATUS FOR MODIFYING A ROW IN A DATABASE TABLE TO INCLUDE META-DATA

(71) Applicant: Oracle International Corporation, Redwood City, CA (US)

(72) Inventor: Daniel ManHung Wong, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 14/754,517

(22) Filed: Jun. 29, 2015

(65) Prior Publication Data

US 2015/0302049 A1 Oct. 22, 2015

Related U.S. Application Data

(63) Continuation of application No. 11/391,033, filed on Mar. 28, 2006, now Pat. No. 9,075,831.

(51) Int. Cl.
*G06F 17/00* (2006.01)
*G06F 17/30* (2006.01)

(52) U.S. Cl.
CPC .. *G06F 17/30377* (2013.01); *G06F 17/30289* (2013.01); *G06F 17/30368* (2013.01); *G06F 17/30348* (2013.01); *G06F 17/30365* (2013.01)

(58) Field of Classification Search
CPC ......... G06F 17/30368; G06F 17/30365; G06F 17/30348; G06F 17/30377
USPC ......... 707/694, 703, 704, 783, 803, 999.009
See application file for complete search history.

(56) References Cited

U.S. PATENT DOCUMENTS

| | | | |
|---|---|---|---|
| 5,133,068 A * | 7/1992 | Crus | G06F 17/30371 |
| 6,820,082 B1 * | 11/2004 | Cook | G06F 21/6227 707/754 |
| 7,069,263 B1 * | 6/2006 | Yee | G06F 17/30551 707/602 |
| 7,200,595 B2 | 4/2007 | Dutta et al. | |
| 7,249,140 B1 | 7/2007 | Korenevsky et al. | |
| 2004/0034619 A1 * | 2/2004 | Lu | G06F 7/00 |
| 2005/0131966 A1 * | 6/2005 | Lou | G06F 17/30348 |
| 2005/0216465 A1 * | 9/2005 | Dutta | G06F 17/30306 |
| 2006/0041591 A1 * | 2/2006 | Rhoads | G06F 17/30038 |
| 2007/0112866 A1 * | 5/2007 | Olson-Williams | G06F 17/30312 |

* cited by examiner

*Primary Examiner* — Dung K Chau
(74) *Attorney, Agent, or Firm* — Shun Yao; Park, Vaughan, Fleming & Dowler LLP (57) ABSTRACT

One embodiment of the present invention provides a database system that facilitates modifying a row in a database table to include meta-data about operations performed on the row. During operation, the database system receives a definition for an extensible row descriptor, the extensible row descriptor indicating meta-data associated with operations performed on a row in a database table. The system then receives a condition for updating the extensible row descriptor. The system determines that executing a command satisfies the condition for updating the extensible row descriptor, and updates the extensible row descriptor.

15 Claims, 5 Drawing Sheets

FIG. 1

| NAME | DEPARTMENT | SALARY | EXTENSIBLE ROW DESCRIPTOR |
|------|------------|--------|---------------------------|
| SUE  | MARKETING  | 30K    | {13579, JOHN}             |
| MARY | ENGINEERING| 85K    | {02468, DANIEL}           |
| ADAM | ACCOUNTING | 45K    | {19375, ELLEN}            |
|      |            |        | {02468, DANIEL}           |
|      |            |        |                           |
|      |            |        |                           |
|      |            |        |                           |

FIG. 3

| NAME | DEPARTMENT  | SALARY |
|------|-------------|--------|
| SUE  | MARKETING   | 30K    |
| MARY | ENGINEERING | 85K    |
| ADAM | ACCOUNTING  | 45K    |
|      |             |        |
|      |             |        |
|      |             |        |
|      |             |        |

METHOD AND APPARATUS FOR MODIFYING A ROW IN A DATABASE TABLE TO INCLUDE META-DATA

RELATED APPLICATIONS

This application is a continuation application of application Ser. No. 11/391,033, entitled "METHOD AND APPARATUS FOR MODIFYING A ROW IN A DATABASE TABLE TO INCLUDE META-DATA," by inventor Daniel ManHung Wong, filed 28 Mar. 2006, the disclosure of which is incorporated by reference in its entirety herein.

BACKGROUND

Field of the Invention

The present invention relates to databases. More specifically, the present invention relates to a method and an apparatus for modifying a row in a database to include meta-data.

Related Art

Database administrators and application developers often find the need to tag rows in database tables with information related to the rows. For example, an administrator may find it useful to know when data was inserted into a database table, or when a row in a database table was last updated. This information can serve various purposes, and is especially useful for facilitating auditing operations and performing security tasks.

One common method for tagging rows in a database table involves inserting an additional column into the database table. The additional column can be used to store any type of information related to rows in the table that an administrator or an organization may need. However, there is presently no easy way to ensure the integrity of the data in the additional column without a significant amount of additional effort. Any user who has access to the database table can alter the data in the additional column, which can cause security problems that can mitigate the benefits of using the additional column.

Hence, what is needed is a method for associating information with data in a database table without the above-mentioned problems.

SUMMARY

One embodiment of the present invention provides a database system that facilitates modifying a row in a database table to include meta-data about operations performed on the row. During operation, the database system receives a definition for an extensible row descriptor, the extensible row descriptor indicating meta-data associated with operations performed on a row in a database table. The system then receives a condition for updating the extensible row descriptor. The system determines that executing a command satisfies the condition for updating the extensible row descriptor, and updates the extensible row descriptor.

In a variation on this embodiment, the system receives an update rule specifying the condition for updating the extensible row descriptor.

In a variation on this embodiment, the update rule specifying the condition for updating the extensible row descriptor is defined by one of an owner of the database table or a super-user.

In a variation on this embodiment, the extensible row descriptor can only be updated by a database, and the extensible row descriptor cannot be modified by a user.

In a variation on this embodiment, the extensible row descriptor is retained in the database table after the corresponding row is deleted, thereby allowing information indicating a delete operation to be retained.

In a variation on this embodiment, a respective operation can include at least one of an update operation, an insert operation, a delete operation, and a select operation.

In a variation on this embodiment, the system creates the database table, in which creating the database table involves receiving an update rule for the extensible row descriptor, the update rule specifying the condition for updating the extensible row descriptor, and incorporating the extensible row descriptor and the update rule into the database table while creating the database table.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), and DVDs (digital versatile discs or digital video discs).

Overview

One embodiment of the present invention teaches a method for tagging a row in a database with meta-data related to operations performed on the database row. Upon creation of a database table, the database receives an extensible row descriptor definition and an update rule definition. The extensible row descriptor is a column in the database table that a user, a super-user, or an administrator cannot modify. Only the database can modify the extensible row descriptor. Hence, the extensible row descriptor is a special column type that the database manages.

In one embodiment of the present invention, an attempt to issue a command that modifies the extensible row descriptor results in the failed attempt being recorded within the extensible row descriptor.

In one embodiment of the present invention, the update rule defines what information is stored in the extensible row descriptor. The update rule instructs the database on how to manage the extensible row descriptor column for the user. For example, the update rule can define when and how the extensible row descriptor can be updated.

In one embodiment of the present invention, a user can perform an operation, such as a SELECT operation, on the extensible row descriptor as long as the operation does not attempt to modify the extensible row descriptor.

In one embodiment of the present invention, the database does not require the definition of an extensible row descriptor. In this embodiment the extensible row descriptor is optional. However, if an extensible row descriptor is defined, then an update rule can also be defined.

In one embodiment of the present invention, the extensible row descriptor and/or the update rule is pre-defined by an administrator. In this embodiment, upon creation of a database table, the extensible row descriptor is automatically inserted into the database table.

In one embodiment of the present invention, the extensible row descriptor and the update rule are implemented as an extension to standard Structured Query Language (SQL) syntax.

Computing Environment

Figure 1:
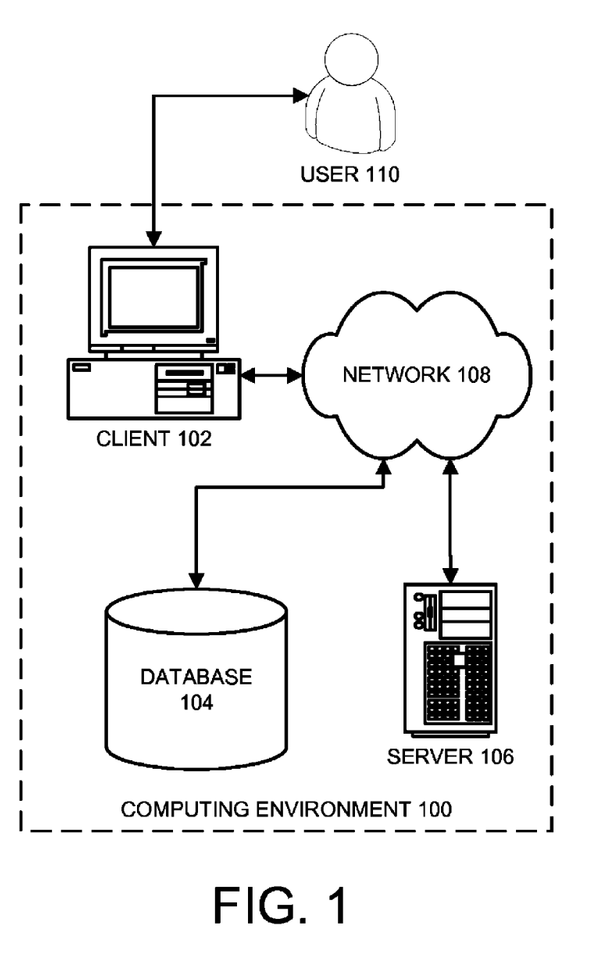
FIG. 1 illustrates a computing environment in accordance with an embodiment of the present invention.

FIG. 1 illustrates a computing environment 100 in accordance with an embodiment of the present invention. Computing environment 100 can generally include any type of computer system, including, but not limited to, a computer system based on a microprocessor, a mainframe computer, a digital signal processor, a portable computing device, a personal organizer, a device controller, and a computational engine within an appliance. Computing environment 100 includes client 102, database 104, server 106, and network 108. Client 102 can communicate with database 104 and server 106 via network 108. User 110 can communicate directly with client 102.

Client 102 can generally include any node on a network including computational capability and including a mechanism for communicating across the network.

Database 104 can generally include any type of system for storing data in non-volatile storage. This includes, but is not limited to, systems based upon magnetic, optical, and magneto-optical storage devices, as well as storage devices based on flash memory and/or battery-backed up memory.

Server 106 can generally include any computational node including a mechanism for servicing requests from a client for computational and/or data storage resources.

Network 108 can generally include any type of wired or wireless communication channel capable of coupling together computing nodes. This includes, but is not limited to, a local area network, a wide area network, or a combination of networks. In one embodiment of the present invention, network 108 includes the Internet.

In one embodiment of the present invention, user 110 creates a new database table in database 104 via client 102. Database 104 then prompts user 110 to create an extensible row descriptor and an update rule for the new database table.

In one embodiment of the present invention, the update rule includes specifies that the database communicates with server 106 to obtain information that is used in updating the extensible row descriptor. This information can include, but is not limited to, the organization that the user is a member of, the security level of the user, and the employee identification number of the user. This embodiment facilitates the use of information that may be readily available in another system, but that is not internally available to database 104.

Existing Database Table

Figure 2:
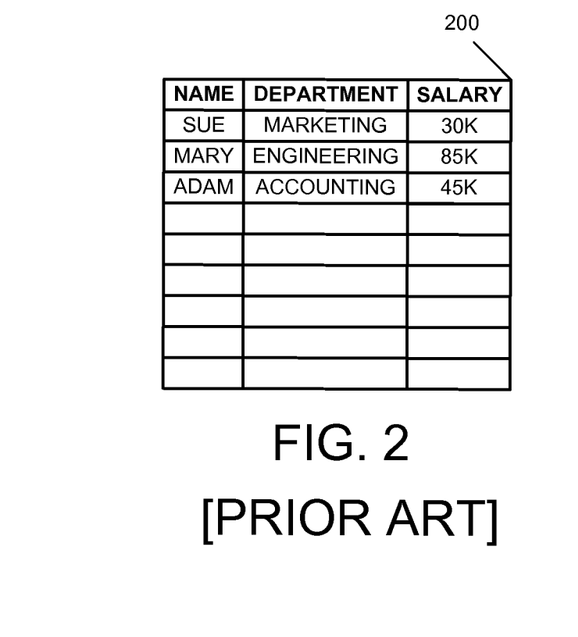
FIG. 2 illustrates an existing database table.

FIG. 2 illustrates an existing database table 200. Database table 200 is an example of an existing database table. Database table 200 represents a portion of an employee list. Note that in an environment where multiple users have permission to modify database table 200, user 110 can modify database table 200 without accountability because there is no way to know which user modified database table 200. One embodiment of the present invention solves this problem by recording which user modified database table 200 in an extensible row descriptor within the table, thus provides accountability for all database operations.

Database Table with Extensible Row Descriptor

Figure 3:
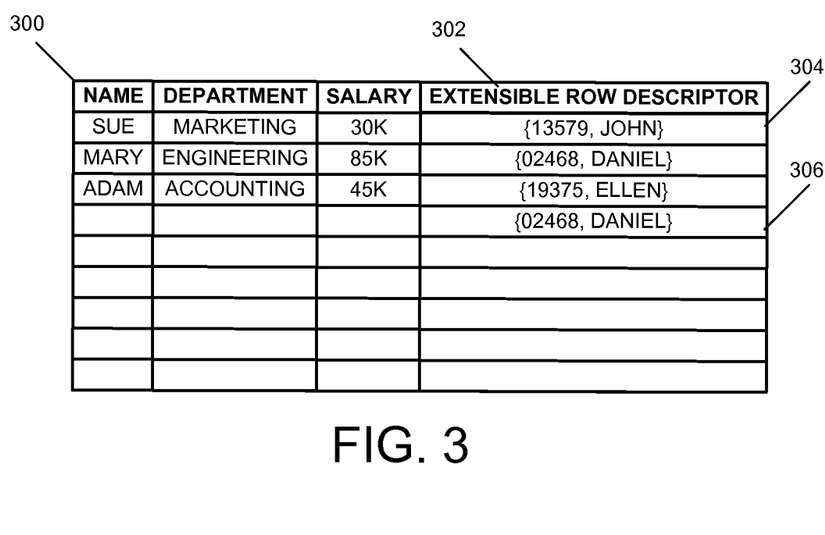
FIG. 3 illustrates a database table with an extensible row descriptor in accordance with an embodiment of the present invention.

FIG. 3 illustrates a database table 300 with an extensible row descriptor 302 in accordance with an embodiment of the present invention. Extensible row descriptor 302 can only be modified by the database in a manner defined by the update rule, and cannot be modified by a user. In one embodiment of the present invention, a super-user cannot modify the update rule.

Note that extensible row descriptor 302 can include any meta-data associated with an operation performed on the corresponding row. This can include, but is not limited to, security attributes (such as a username of a user who last updated the row), a timestamp of the last update, the System Change Number (SCN) of the last update, or the application module that performed the last update.

In one embodiment of the present invention, extensible row descriptor 302 can include multiple fields and/or columns.

In one embodiment of the present invention, each cell in the extensible row descriptor 302 column is defined to store the name and identification number of the last user who modified a particular row within database table 300. For example, cell 304 reveals that the last user to modify the first row in database table 300 was user "JOHN" whose identification number is "13579". If a problem is discovered in the information stored in the first row of database table 300, user "JOHN" will be consulted in an attempt to restore database table 300 to its proper state. However, if a discrepancy is found in conventional database table 200, it will be much more difficult, and perhaps impossible, to identify which user caused the problem found in database table 200.

In one embodiment of the present invention, deleting a row in database table 300 does not result in the deletion of the extensible row descriptor information as illustrated by cell 306. This is advantageous because it facilitates in determining when a row is improperly deleted.

In one embodiment of the present invention, deleting a row in database table 300 results in the deletion of the extensible row descriptor entry for the deleted row.

Update Rule

Figure 4:
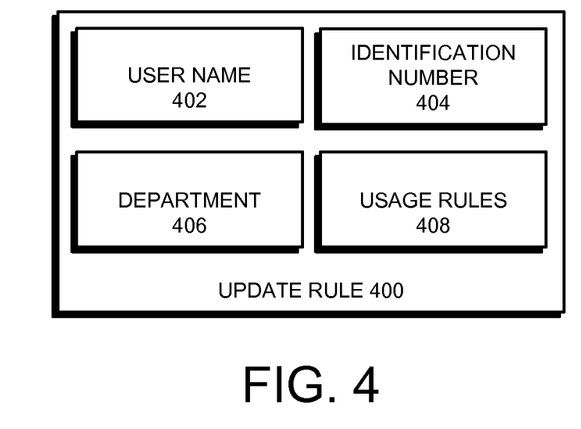
FIG. 4 illustrates an update rule in accordance with an embodiment of the present invention.

FIG. 4 illustrates an update rule 400 in accordance with an embodiment of the present invention. Update rule 400 specifies what information should be stored in the extensible row descriptor and defines the rules that should be used to update the extensible row descriptor. Update rule 400 includes user name 402, identification number 404, department 406, and usage rules 408. User name 402, identification number 404, and department 406 are all examples of possible fields that can be included as part of the value of the extensible row descriptor.

Usage rules 408 define when the extensible row descriptor should be updated. For example, usage rules 408 may specify that any command resulting in modification to a row in the database table should result in the updating of the extensible row descriptor with the information specified in update rule 400. Note that update rule 400 merely provides an example of one possible update rule. In general, update rule 400 is not limited to the fields illustrated in FIG. 4.

In one embodiment of the present invention, each row can have its own update rule.

In one embodiment of the present invention, update rule 400 can require information that is not stored within the database. In this embodiment, update rule 400 includes instructions and/or commands required to obtain the information that is stored externally to the database.

Row Modification

Figure 5:
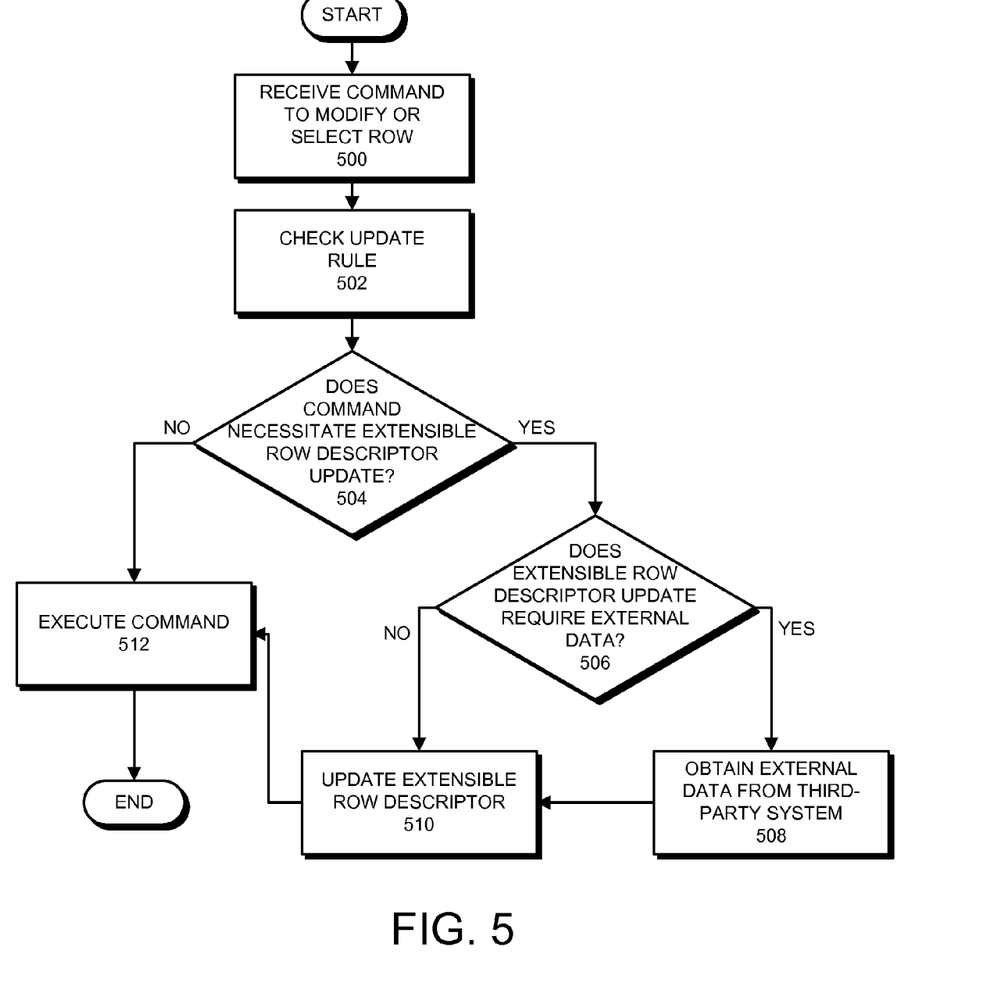
FIG. 5 presents a flowchart illustrating the row modification process in accordance with an embodiment of the present invention.

FIG. 5 presents a flowchart illustrating the row modification process in accordance with an embodiment of the present invention. The process begins when the system receives a command to modify or select a row in a database table (step 500). Note that if the command involves modifying the extensible row descriptor then the database will reject the command. The extensible row descriptor can only be modified by the database and not by a command issued by a user.

The system checks the update rule for the table and/or row that is to be selected or modified (step 502). Next, the system determines if the command necessitates an update of the extensible row descriptor (step 504). The system then determines if an update of the extensible row descriptor is necessary by referring to the rules that were defined in the update rule for the particular table and/or row in question. If an update of the extensible row descriptor is not necessary, the system executes the command (step 512). However, if an update of the extensible row descriptor is necessary, the system determines if the update of the extensible row descriptor requires data that is stored externally to the database (step 506). If not, the system updates the extensible row descriptor following the usage rules defined in the update rule (step 510). The system then executes the command (step 512).

On the other hand, if the system does require external data to update the extensible row descriptor, the system obtains the required external data from a third-party system (step 508). The system then proceeds to update the extensible row descriptor (step 510). Finally, the system executes the command issued at the beginning of this process (step 512).

Table Creation

Figure 6:
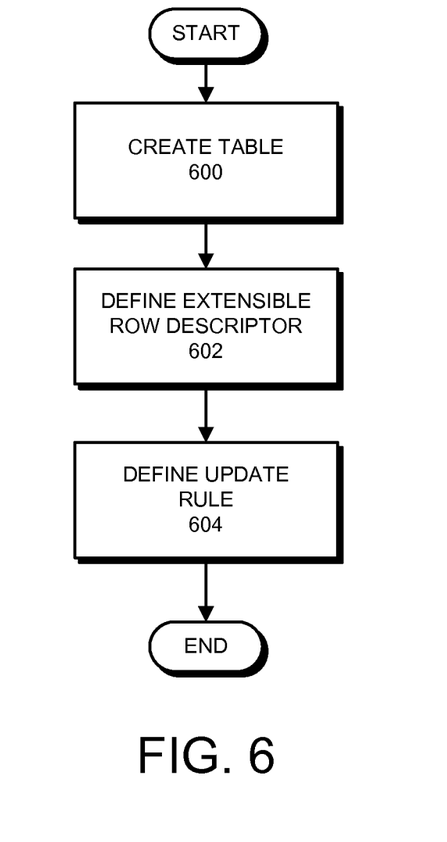
FIG. 6 presents a flowchart illustrating the database table creation process in accordance with an embodiment of the present invention.

FIG. 6 presents a flowchart illustrating the database table creation process in accordance with an embodiment of the present invention. The process begins when a user creates a table (step 600). In doing so, the user defines an extensible row descriptor (step 602). Defining an extensible row descriptor involves defining one or more columns to store meta-data about operations performed on each row.

In one embodiment of the present invention, an administrator or a super-user pre-defines the extensible row descriptor.

After the extensible row descriptor has been defined, the user defines the update rule (step 604). Defining the update rule involves specifying when the extensible row descriptor should be updated, and what information should be stored in the extensible row descriptor.

In one embodiment of the present invention, an administrator or super-user pre-defines the update rule.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
   receiving a definition for an extensible row descriptor, the extensible row descriptor indicating meta-data associated with operations performed on a row in a database table;
   receiving an update rule from a user specifying a condition for updating the extensible row descriptor, wherein only at least one of an owner of the database table and a super-user is permitted to define the update rule specifying the condition for updating the extensible row descriptor;
   determining that executing a command satisfies the condition for updating the extensible row descriptor corresponding to the row; and
   updating the extensible row descriptor corresponding to the row,
   wherein the extensible row descriptor can only be updated by a database, and the extensible row descriptor cannot be modified by a user-submitted command.

2. The method of claim 1, further comprising:
   deleting the row in the database table; and
   retaining the extensible row descriptor corresponding to the deleted row in the database table after the row is deleted, thereby allowing information associated with a delete operation to be retained.

3. The method of claim 1, wherein a respective operation includes at least one of:
   an update operation;
   an insert operation;
   a delete operation; and
   a select operation.

4. The method of claim 1, further comprising creating the database table, wherein creating the database table involves:
   incorporating the extensible row descriptor and the update rule into the database table while creating the database table.

5. The method of claim 1, wherein one or more update rules are received for specific rows of a plurality of a rows in the database table.

6. The method of claim 1, wherein the update rule specifies when the extensible row descriptor is to be updated and specifies information to be stored in the extensible row descriptor.

7. The method of claim 1, wherein a user-submitted command cannot modify the extensible row descriptor.

8. The method of claim 7, wherein the user-submitted command is one of an insert, update, or delete operation.

9. A non-transitory computer-readable storage medium storing instructions that, when executed by one or more processors, cause the one or more processors to perform operations for modifying a row in a database table to include meta-data about operations performed on the row, the operations performed by the one or more processors comprising:
   receiving a definition for an extensible row descriptor, the extensible row descriptor indicating meta-data associated with operations performed on a row in a database table;
   receiving an update rule from a user specifying a condition for updating the extensible row descriptor, wherein only at least one of an owner of the database table and a super-user is permitted to define the update rule specifying the condition for updating the extensible row descriptor;

determining that executing a command satisfies the condition for updating the extensible row descriptor corresponding to the row; and updating the extensible row descriptor corresponding to the row, wherein the extensible row descriptor can only be updated by a database, and the extensible row descriptor cannot be modified by a user-submitted command.

10. The non-transitory computer-readable storage medium of claim 9, wherein the computer-readable storage medium stores additional instructions that, when executed, cause the one or more processors to perform additional steps comprising:

deleting the row in the database table; and retaining the extensible row descriptor corresponding to the deleted row in the database table after the row is deleted, thereby allowing information associated with a delete operation to be retained.

11. The non-transitory computer-readable storage medium of claim 9, wherein a respective operation includes at least one of:

an update operation;
an insert operation;
a delete operation; and
a select operation.

12. The non-transitory computer-readable storage medium of claim 9, wherein the computer-readable storage medium stores additional instructions that, when executed, cause the one or more processors to perform additional steps comprising:

creating the database table, wherein creating the database table involves:

incorporating the extensible row descriptor and the update rule into the database table while creating the database table.

13. An apparatus that modifies a row in a database table to include meta-data about operations performed on the row, comprising:

a processor;
a database;
a definition-receiving mechanism configured to receive a definition for an extensible row descriptor, the extensible row descriptor indicating meta-data associated with operations performed on a row in a database table of the database;

a condition-receiving mechanism configured to receive an update rule from a user specifying a condition for updating the extensible row descriptor, wherein only at least one of an owner of the database table and a super-user is permitted to define the update rule specifying the condition for updating the extensible row descriptor;

a determining mechanism configured to determine that executing a command satisfies the condition for updating the extensible row descriptor corresponding to the row; and an updating mechanism configured to update the extensible row descriptor corresponding to the row, wherein the updating mechanism is further configured to ensure that the extensible row descriptor can only be updated by the database, and cannot be updated by a user-submitted command.

14. The apparatus of claim 13, further comprising a communication mechanism configured to communicate with a third-party system to obtain meta-data associated with operations performed on the row.

15. The apparatus of claim 13, further comprising a checking mechanism configured to check an update rule for the extensible row descriptor to determine if the extensible row descriptor needs to be updated.

* * * * *

UNITED STATES PATENT AND TRADEMARK OFFICE
CERTIFICATE OF CORRECTION

PATENT NO. : 9,747,328 B2  
APPLICATION NO. : 14/754517  
DATED : August 29, 2017  
INVENTOR(S) : Daniel ManHung Wong Page 1 of 1

It is certified that error appears in the above-identified patent and that said Letters Patent is hereby corrected as shown below:

In the Claims

Column 6, Line 42 should read "rules are received for specific rows of a plurality of rows".

Signed and Sealed this
Fourth Day of December, 2018

Andrei Iancu
*Director of the United States Patent and Trademark Office*